N. NILSON.
AUTOMATIC WEIGHING SCALE.
APPLICATION FILED MAR. 18, 1907.
915,468.
Patented Mar. 16, 1909.
2 SHEETS—SHEET 1.
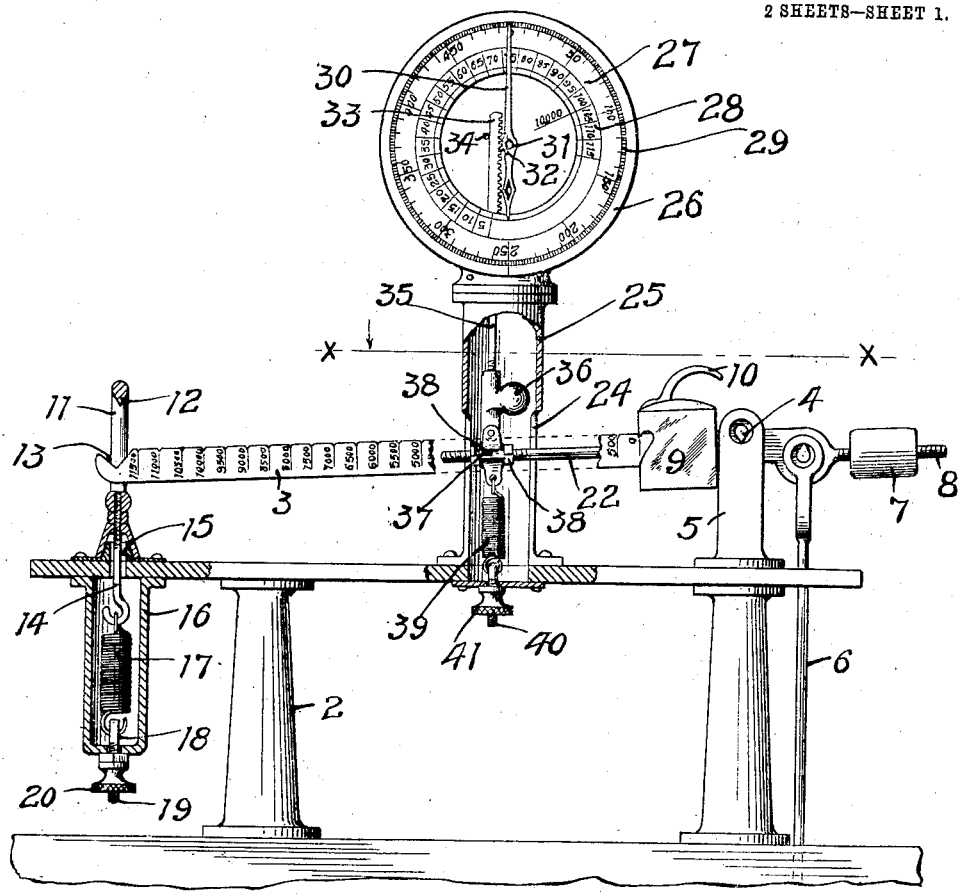
Fig 1.
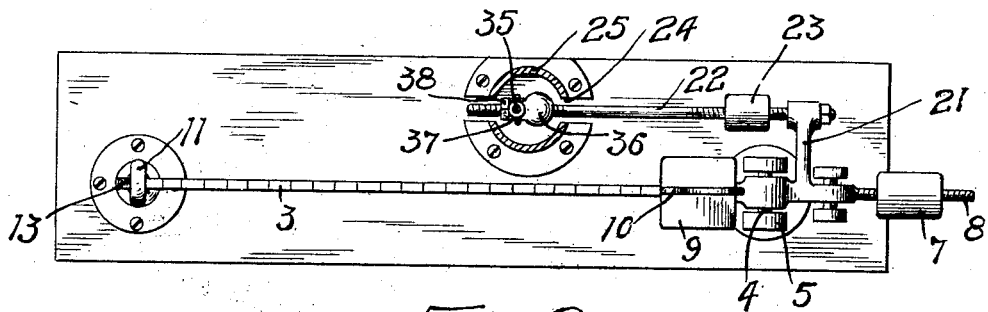
Fig 2. x-x
WITNESSES
INVENTOR
NILS NILSON
BY
HIS ATTORNEYS N. NILSON.
AUTOMATIC WEIGHING SCALE.
APPLICATION FILED MAR. 18, 1907.
915,468.
Patented Mar. 16, 1909.
2 SHEETS—SHEET 2.
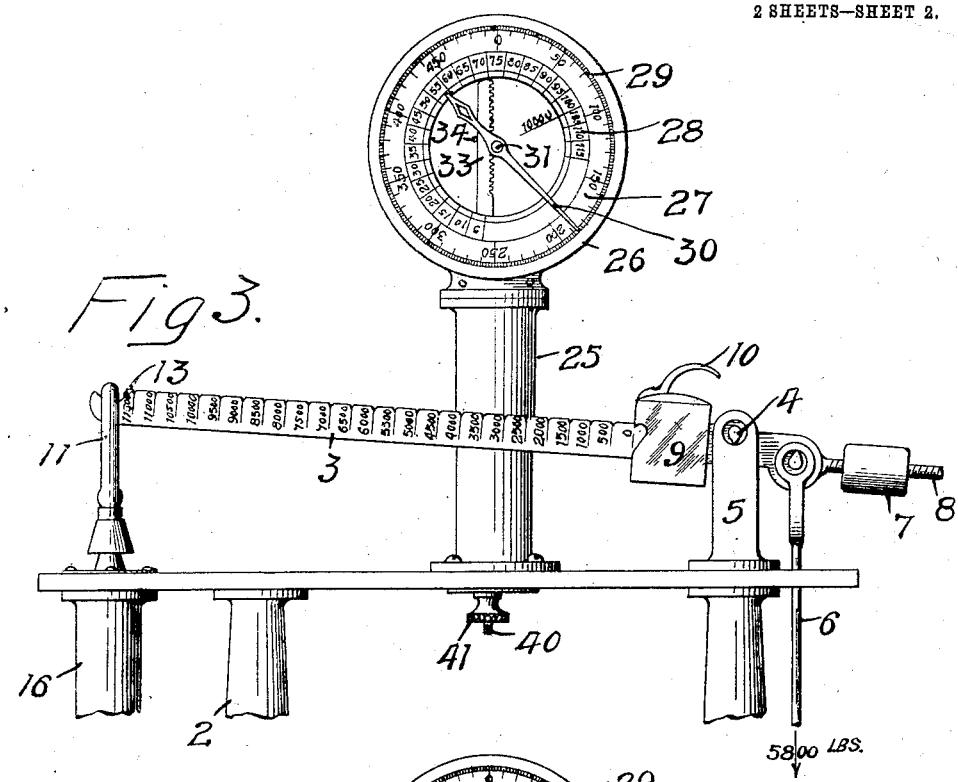
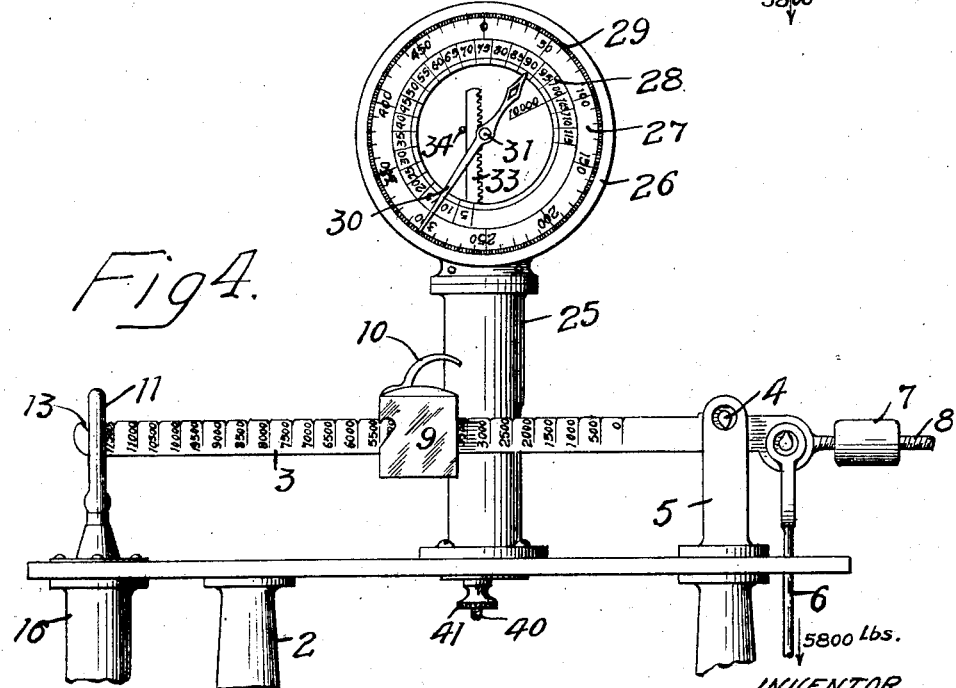
WITNESSES
INVENTOR
NILS NILSON
BY
HIS ATTORNEYS

UNITED STATES PATENT OFFICE.

NILS NILSON, OF WAYZATA, MINNESOTA.

AUTOMATIC WEIGHING-SCALE.

No. 915,468.

Specification of Letters Patent.

Patented March 16, 1909.

Application filed March 18, 1907. Serial No. 362,878.

*To all whom it may concern:*

Be it known that I, NILS NILSON, of Wayzata, Hennepin county, Minnesota, have invented certain new and useful Improvements in Automatic Weighing-Scales, of which the following is a specification.

My invention relates to weighing scales, and the object of the invention is to improve the scale shown and described in Letters Patent of the United States, issued to me January 29, 1907, No. 842,576.

My invention consists generally in various constructions and combinations, all as hereinafter described and particularly pointed out in the claims.

In the accompanying drawings, forming part of this specification, Figure 1 is a front elevation partially in section, of a scale embodying my invention. Fig. 2 is a plan section on the line x—x of Fig. 1. Fig. 3 is a front elevation illustrating the movement of the scale when the load is applied to the platform. Fig. 4 is a similar view showing the position of the beam and the indicator when the scale has been brought to a balance.

In the drawing, 2 represents the frame of the scale having the usual graduated beam 3 supported in knife edge bearings 4 in standards 5. A rod 6 extends downwardly from the short arm of the beam to the scale platform, which for convenience has been omitted in the illustration as it forms no part of the present invention. A balance weight 7 is mounted on a threaded stem 8 which projects from the short arm of the beam to facilitate the perfect balance of the scale when there is no load on the platform. This is a common attachment for scales of this kind. A beam weight 9 is slidably arranged on the beam and provided with the usual locking device 10. A loop 11 is mounted on the scale at the opposite end of the beam and has a knife edge 12 to enter a V-shaped socket 13 in the end of the beam. The lower end of the loop is attached to a rod 14 that is slidably mounted in a socket 15 on the scale frame and extends down into a housing 16 beneath the said frame and is attached to one end of a coil spring 17 whose opposite end is connected to an eye 18 on a threaded bolt 19 that is adjustable in the end of said housing for the purpose of increasing or decreasing the tension of the spring 17 by means of a thumb nut 20. This spring 17 is put under tension when a load is applied to the platform and the long arm of the scale beam swings upwardly before the beam weight is adjusted thereon to balance the load. The short arm of the scale beam is provided with a right angled extension 21 wherein the threaded end of a rod 22 is mounted, said rod extending parallel with the scale beam and provided with a balance weight 23 located near said extension. The other end of the rod 22 is also threaded and projects into an opening 24 provided in the wall of a hollow standard 25 that is mounted on the frame of the scale at one side of and near the scale beam. An indicator frame 26 is supported on said standard and has a dial 27 with an inner or primary circle of graduations 28 and an outer or secondary circle of graduations 29. An indicator hand 30 is mounted on a spindle 31 and adapted to sweep over said graduations. The spindle is provided with a pinion 32 that is engaged by the teeth of a rack bar 33 which operates vertically between said pinion and a pin 34. A rod 35 forms a continuation of the lower end of said rack bar, and a weight 36 is attached to the lower end of said rod and normally tends to hold the said rack bar in engagement with the pinion, and said weight has a pivotal connection with a collar 37 loosely mounted on the end of the rod 22 and held in place thereon by lock nuts 38. A spring 39 is also attached to said collar and has a threaded pin 40 at its lower end provided with a thumb nut 41 by means of which the pin may be adjusted lengthwise and the tension of the spring thereby regulated.

In the operation of the scale the load is applied to the platform and assuming that it weighs 5800 pounds the scale beam will be tilted as indicated in Fig. 3 lifting the rod 22 and the rack bar and revolving the indicator hand to the position shown in Fig. 3 or until it points to the graduation marked 5500 on the primary circle. The operator will then know that the beam weight should be adjusted on the graduation marked 5500, and having moved the weight to that point the scale beam will be depressed, the rack bar will be drawn down and the indicator will revolve in the opposite direction until it points to the mark 300 on the outer circle, as indicated in Fig. 4. The scale beam being at a balance at this point the correct weight of the load will be indicated by the sum of 5500 plus 300 which equals 5800, the weight on the scale.

The result obtained is the same as in my patent above referred to and the method of operation is similar, but I am able to dispense with one of the dials of my former patent and obtain the approximate and the total weight from the combination of the primary and secondary graduations on the single dial. I thus simplify and reduce the cost of the scale and at the same time make it more compact and convenient to read and operate.

I claim as my invention:

1. In a scale, the combination, with a beam and a spring arranged to yieldingly resist the movement of said beam at a predetermined point in its travel, a beam weight, a dial having primary and secondary graduations, an indicator hand, means actuated by the movement of the beam for operating said hand, a spring arranged to resist the movement of said means, said primary graduations indicating the adjustment to be made of the beam weight preliminary to ascertaining the weight of the article on the scale, said secondary graduations indicating fractional parts less than what is indicated by the beam weight, whereby when a load is placed on the scale the indicator will move in one direction over the primary graduations to indicate approximately the proper adjustment of the weight on the beam, and the movement of the indicator in the opposite direction over the secondary graduations when the weight has been adjusted on the beam to balance the load, will indicate the fractional part to be added to the graduations indicated on the primary scale to equal the total weight of the load.

2. In a scale, the combination, with a beam having a rod or arm connected thereto and extending parallel therewith, a spring arranged to yieldingly resist the movement of said beam at a predetermined point in its travel, a beam weight, a dial having primary and secondary graduations, an indicator hand therefor operatively connected with said rod, a spring arranged to yieldingly resist the movement of said rod in one direction, the primary graduations on said dial indicating approximately the proper position of the scale weight on the beam to balance the load on the scale, means actuated from the beam to cause the indicator to show the adjustment to be made in the beam weight and the secondary graduations indicating by the backward movement of the indicator thereover the fractional part to be added when the scale weight is moved to the position on the beam indicated by the primary graduations, whereby the operator at a glance can determine the approximate position of the scale weight, and then, having adjusted the weight and balanced the beam, the total weight of the load.

3. In a scale, the combination, with a beam, a beam weight therefor, an indicator to show the adjustment to be made in the beam weight preliminary to ascertaining the weight of the article on the scale, means arranged to yieldingly resist movement of said beam when it has traveled a predetermined distance to cause the indicator to show the adjustment to be made in the beam weight, means to indicate fractional parts less than what is indicated by the beam weight, and means operated from the beam for actuating the said indicator to indicate the fractional part to be added to the weight indicated by the beam weight to obtain the total of the weight on the scale and means arranged to yieldingly resist the movement of said indicator actuating means.

4. In a scale, the combination, with a beam, a beam weight, a dial having primary and secondary graduations one within the other and both reading from left to right, an indicator hand pivoted between its ends and having one end pointing to said primary graduations and the other end pointing to said secondary graduations, said primary graduations indicating the adjustment to be made of the beam weight preliminary to ascertaining the weight of the article on the scale, means connected with said beam for moving said indicator over said secondary graduations, said secondary graduations indicating fractional parts less than what is indicated by the beam weight, whereby when a load is placed on the scale the indicator will move in one direction over the primary graduations to indicate approximately the proper position of the weight on the beam and the movement of the indicator in the opposite direction over the secondary graduations when the weight has been adjusted on the beam to balance the load will indicate the fractional part to be added to the graduations indicated on the primary scale to equal the total weight of the load.

5. In a scale, the combination, with a beam, a beam weight therefor, a loop in the path of the free end of said beam, a spring device having means for regulating its tension and connected with said loop and said loop yieldingly resisting the movement of said beam when it has traveled a predetermined distance, an indicator to show the adjustment to be made in the beam weight preliminary to ascertaining the weight of the article on the scale and to indicate fractional parts less than what is indicated by the beam weight and said spring device, when actuated from the beam, causing the said indicator to show the adjustment to be made in the beam weight, a second spring device, and means connected with said second spring device and beam and with said indicator and actuated by the movement of the beam to indicate fractional parts less than what is indicated by the beam weight, whereby the initial movement of the indicator will determine approximately the proper position of the weight, and this weight plus the fractional part designated by the indicator will equal the total weight on the scale.

6. In a scale, the combination, with a beam, a beam weight therefor, a loop arranged in the path of the free end of said beam to be engaged thereby, a spring device having means at one end for regulating its degree of tension, and means at its other end for connecting said spring with said loop, whereby said loop will yieldingly resist the movement of said beam when it has traveled a predetermined distance, an indicator to show the adjustment to be made in the beam weight, preliminary to ascertaining the weight of the article on the scale and said spring device when actuated from the beam, causing the said indicator to show the adjustment to be made in the beam weight.

7. In a scale, the combination, with a beam, and means arranged to yieldingly resist the movement of said beam at a predetermined point in its travel, a beam weight, a dial having primary and secondary graduations, an indicator hand, means actuated by the movement of the beam for operating said hand, means arranged to yieldingly resist the movement of said operating means, said primary graduations indicating the adjustment to be made of the beam weight preliminary to ascertaining the weight of the article on the scale, said secondary graduations indicating fractional parts less than what is indicated by the beam weight, whereby when a load is placed on the scale, the indicator will move in one direction over the primary graduations to indicate approximately the proper adjustment of the beam weight and the movement of the indicator in the opposite direction over the secondary graduations when the weight has been adjusted on the beam to balance the load will indicate the fractional part to be added to the graduations on the primary scale to equal the total weight of the load.

In witness whereof, I have hereunto set my hand this 9th day of March 1907.

NILS NILSON.

Witnesses:
  RICHARD PAUL,
  J. B. ERA.